United States Patent
Bary et al.

(10) Patent No.: US 6,932,185 B2
(45) Date of Patent: Aug. 23, 2005

(54) ACQUISITION METHOD AND DEVICE FOR SEISMIC EXPLORATION OF A GEOLOGIC FORMATION BY PERMANENT RECEIVERS SET ON THE SEA BOTTOM

(75) Inventors: Rénate Bary, Rueil Malmaison (FR); Patrick Meynier, Chatou (FR)

(73) Assignee: Institut Francais du Petrole, Rueil-Malmaison Cedex (FR)

( * ) Notice: Subject to any disclaimer, the term of this patent is extended or adjusted under 35 U.S.C. 154(b) by 30 days.

(21) Appl. No.: 10/642,177

(22) Filed: Aug. 18, 2003

(65) Prior Publication Data

US 2005/0098377 A1 May 12, 2005

(30) Foreign Application Priority Data

Aug. 22, 2002 (FR) .............................. 02 10502

(51) Int. Cl.[7] .............................. G01V 1/16; G01V 1/38
(52) U.S. Cl. ...................... 181/122; 181/118; 181/120; 181/112; 181/110; 367/15; 367/16; 367/77; 367/78
(58) Field of Search ................................ 181/122, 112, 181/118–120, 110, 108, 104; 367/133, 141, 15–18, 21, 56, 76–78

(56) References Cited

U.S. PATENT DOCUMENTS

| | | | | |
|---|---|---|---|---|
| 4,134,097 A | * | 1/1979 | Cowles | 367/13 |
| 4,422,164 A | * | 12/1983 | Bowden et al. | 367/15 |
| 4,692,906 A | * | 9/1987 | Neeley | 181/122 |
| 4,712,199 A | * | 12/1987 | Rialan et al. | 367/76 |
| 4,870,625 A | * | 9/1989 | Young et al. | 367/16 |

(Continued)

FOREIGN PATENT DOCUMENTS

| | | | | |
|---|---|---|---|---|
| EP | 893706 A1 | * | 1/1999 | G01V/1/22 |
| FR | 2738642 A1 | * | 3/1997 | G01V/1/18 |
| FR | 2774775 A1 | * | 8/1999 | G01V/1/04 |
| FR | 2818388 A1 | * | 6/2002 | G01V/1/38 |
| FR | 2834074 A1 | * | 6/2003 | G01V/1/047 |
| GB | 2394045 A | * | 4/2004 | G01V/1/38 |
| WO | WO 9807050 A1 | * | 2/1998 | G01V/1/38 |

OTHER PUBLICATIONS

Entralgo et al., The Challenge of Permanent 4–C Seafloor Systems, The Leading Edge, Society of Exploration Geophysicists, US. vol. 20, No. 6, Jun. 2001, pp. 614, 616 and 620.

Momma et al., Monitoring System For Submarine Earthquakes and Deep Sea Environment, Oceans '97, MTS/IEEE, Conference Proceedings (Cat No. 97CH36105), Conference Proceedings, Halifax, NS, Canada, vol. 2 (Oct. 6–9, 1997) pp. 1453–1459.

*Primary Examiner*—Edgardo San Martin
(74) *Attorney, Agent, or Firm*—Antonelli, Terry, Stout & Kraus, LLP

(57) ABSTRACT

A method and device for seismic exploration of a subsea geologic formation by pickups set on the sea bottom and intermittently connectable to active data acquisition stations (11) brought nearby. Permanent passive reception stations (1) comprising a heavy pedestal provided with housings for seismic pickups (geophones (6), hydrophone (7) which receive acoustic or seismic signals from the underlying formation are arranged at the bottom of the water body. When collection sessions for the signals received by the pickups are scheduled, mobile active acquisition stations (11) connected to permanent passive reception stations (1) are positioned at the bottom of the water body. The signals picked up are then recorded, for the time required to carry out at least one session of acquisition and recording of the acoustic or seismic signals received by the passive stations in response to the emission of seismic waves by one or more seismic sources. The mobile active acquisition stations (11) are thereafter recovered at the surface and the records acquired by each one are transferred to a central collection laboratory.

35 Claims, 5 Drawing Sheets

U.S. PATENT DOCUMENTS

| | | | | |
|---|---|---|---|---|
| 5,119,341 A | * | 6/1992 | Youngberg | 367/5 |
| 5,189,642 A | * | 2/1993 | Donoho et al. | 181/122 |
| 5,253,223 A | * | 10/1993 | Svenning et al. | 181/122 |
| 5,550,787 A | * | 8/1996 | Rialan et al. | 367/77 |
| 5,579,285 A | * | 11/1996 | Hubert | 367/133 |
| 5,682,357 A | * | 10/1997 | Rigsby | 181/110 |
| 5,747,754 A | | 5/1998 | Svenning et al. | |
| 5,822,273 A | * | 10/1998 | Bary et al. | 367/77 |
| 6,005,828 A | * | 12/1999 | Carroll et al. | 367/19 |
| 6,070,129 A | * | 5/2000 | Grouffal et al. | 367/77 |
| 6,474,254 B1 | * | 11/2002 | Ambs et al. | 114/312 |
| 2004/0156267 A1 | * | 8/2004 | O'Brien et al. | 367/15 |

\* cited by examiner

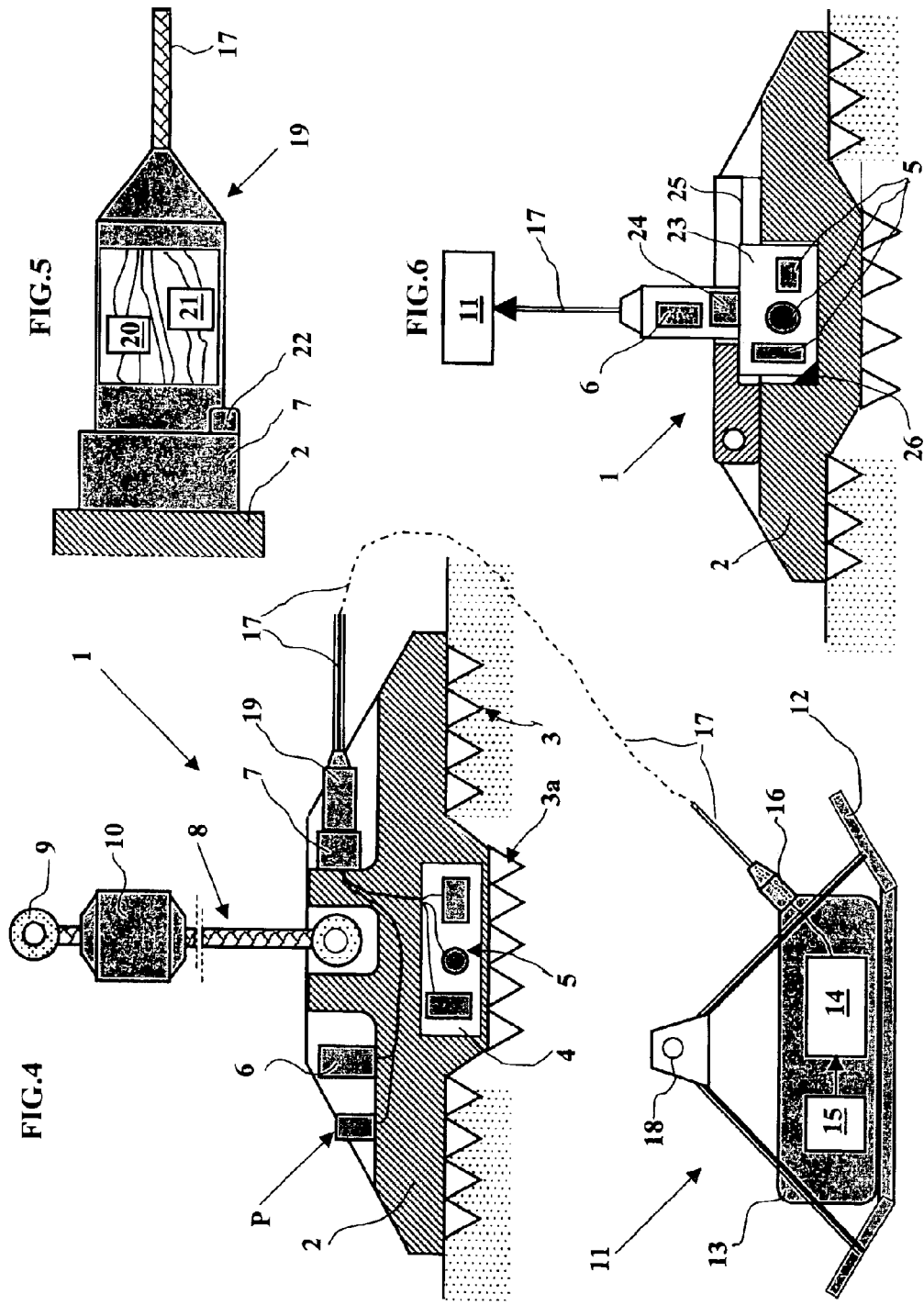

ACQUISITION METHOD AND DEVICE FOR SEISMIC EXPLORATION OF A GEOLOGIC FORMATION BY PERMANENT RECEIVERS SET ON THE SEA BOTTOM

FIELD OF THE INVENTION

The present invention relates to a seismic data acquisition device comprising permanent pickups set on the sea bottom and intermittently connectable to data acquisition stations.

BACKGROUND OF THE INVENTION

Acquisition of seismic data at the sea bottom is a methodology affording many advantages and great possibilities of obtaining multicomponent seismic data of very high quality at a reasonable cost.

The main goals of marine seismic surveys in deep and ultradeep offshore zones are:
- finer characterization of reservoirs by acquisition of the complete wave field (4C) allowing to reduce drilling risks, and
- reservoir monitoring to detect variations in a reservoir by repeated seismic acquisitions (4D).

The location of seismic receivers on the sea bottom allows to eliminate the multiples due to the water layer and, since the ambient noise is lower, to increase the signal amplitude, which leads to an improvement in the seismic images. Recording the S waves and the P waves allows to obtain additional structural or mechanical information concerning the lithology, the fluids, the fractures, and also facilitates imagery of complex structures and in the presence of gas.

The goal of repetitive seismic surveys is to detect variations in underground reservoirs due to the production of hydrocarbons. It is therefore necessary to carry out repeated and staggered seismic measurements. The differences between two measurements represent the variations that have occurred in the reservoir. The measuring accuracy and the repetitiveness must be guaranteed. The measuring conditions therefore have to be strictly identical between two surveys, which are generally staggered over a period of several months. The key parameters are the position, the orientation and the coupling of the pickups. The amplitude of the measurements, inherent in the errors linked with these parameters and the noise due to the instruments, has to be significantly lower than the signal reflecting the changes in the reservoir. The existing 4D multicomponent data sets do not allow quantification of the differences with precision.

Activity in the field of seismic exploration of underground zones lying under a deep water layer ranging between about 300 m and 1500 m (referred to as deep offshore) and even deeper (ultradeep offshore) is in full expansion. The average size of the oil fields that are going to be developed in future increases considerably with the water depth Since the start-up costs, the production costs and the associated risks are all the higher as the depth of immersion increases, it is all the more important to optimize production. This requires new exploration and production technologies allowing to reduce uncertainties and to produce more rapidly at an acceptable cost.

Seismic methods are developing constantly. However, despite improved results, their cost is still considered to be too high by oilmen to be applied systematically. Multicomponent seismic prospecting (3C/4C) and seismic prospecting referred to as repetitive (4D) are clearly identified currently as technologies with the highest expansion potential and which will join together to such an extent that it will be possible to manage underground reservoirs by using the additional data available and to combine them with the data obtained from the instruments in the well. The challenge consists in putting on the market a seismic exploration device with pickups located on the sea bottom at a reasonable cost, while taking account of the profit provided by such systems in terms of information abundance and logistic advantages. The most suitable exploration device must meet the requirements of seismic prospecting for reservoir characterization as well as reservoir monitoring during development, notably under deep offshore conditions, while being reliable, effective and economical.

OBC type seismic prospecting methods using a seismic cable or streamer laid on the sea bottom are well-known. Seismic receivers such as geophones mounted on U-joints to provide correct orientation or hydrophones are arranged all along this part and are coupled with the bottom The receivers are connected by lines internal to the streamer to an acquisition equipment on a boat at the surface. Several cables can be laid in parallel, thus forming a 3D seismic device. Such streamers are commonly used down to depths of about 500 m and even, in some cases, of more than 1000 m The streamers are towed immersed within the context of seismic prospecting operations or permanently installed within the context of long-term monitoring (4D seismic monitoring). A second boat is used to move the seismic source. Unless the cables are buried in the sediments, coupling of the pickups with the sea bottom is not optimal and, despite a large number of pickups, the seismic data acquired are of average quality.

Devices of this type are for example described in patents U.S. Pat. No. 4,870,625, WO-99/23,510, 98/07,050 or 97/13,167.

It is also well-known for oceanographic research, notably for surveys of the structure and the seismicity of the continental margin, to lower down to the sea bottom (OBS type) acquisition stations consisting each of a sealed box containing seismic receivers, hydrophones and geophones, etc., and the associated electronic equipment, allowing continuous recording of the low-frequency seismic signal and storage of the data in a mass memory. Coupling of the pickups in the sediments is satisfactory if the module comprising the geophones is outside the station. Recovery of the acquired data occurs after pulling the equipment from the bottom to the surface. A launching device activated by acoustic control from the boat at the surface allows disconnection of a ballast, then pulling of the acquisition equipment to the surface, and signaling devices such as a flag and a warning light allow to locate it at sea After each use, a station is reconditioned prior to a new immersion. Most of these stations work at depths that can reach 6000 m. The number of stations used for a scientific mission is relatively small and the distance between the stations can range from several hundred meters to several hundred kilometers. The recording time, which can range from one week to several months, is conditioned by the data storage capacity and by the range of the supply battery.

Devices of this type are for example described in patents U.S. Pat. No. 4,422,164; 4,692,906 or 5,189,642.

It is also well-known to install at the sea bottom seismic data acquisition units so as to improve coupling of the pickups with the underlying formation.

This installation can be carried out using a subsea robot or by launching from the surface acquisition units that are sufficiently streamlined to directly stick into the bottom under the effect of gravity. These seismic signal acquisition units include a streamlined part or boom provided with a housing for at least one seismic receiver (a 3C geophone and a hydrophone for example), inclinometers for measuring their orientation, a compass and a seismic data collection module, as well as means of positioning each acquisition unit at the bottom (acoustic telemetry), and surface means for recovery of the seismic data collected. Recovery of these units at the end of an operation is also performed by means of the robot. A device of this type is intended to work at water depths up to 1500 m.

Such acquisition devices are for example described in French patent application 00/16,536 or in patents FR-2,738, 642 and U.S. Pat. No. 4,134,097.

Patent FR-2,774,775 filed by the applicant also describes a method intended for seismic exploration of an offshore reservoir wherein one or more seismic emission units comprising one or more seismic sources associated with power supply means are lowered to the sea bottom, each one of these units being connected to the surface by a multifunction umbilical. Seismic receivers can also be coupled with the surface from the bottom.

The underwater acquisition devices, whether mobile or coupled with the bottom of the water mass, are generally associated with acoustic positioning means. The relative position of the devices in relation to several surface buoys provided with satellite locating means (GPS positioning system) is located by acoustic telemetry. Locating devices combining acoustic telemetry and satellite positioning are for example described in patents U.S. Pat. No. 5,119,341 and 5,579,285.

Patent application FR-2001/16,652 filed by the applicant describes another multicomponent seismic data acquisition device that can be used within the context of active seismic prospecting surveys or for long-term detection of microseismic events generated by natural evolutions in the subsoil (passive monitoring). It comprises a central control and acquisition station, a plurality of seismic bottom acquisition stations suited to go down, under the effect of gravity, to the bottom of the water mass and to enter it so as to couple the seismic receivers with the underground formation, and several relay buoys suited to float at the surface of the water and comprising each for example GPS type satellite positioning means, and radio and acoustic wave transmission means allowing to position the bottom stations and to relay the exchanges between them and the central control and recording station.

SUMMARY OF THE INVENTION

The method of seismic exploration of a subsea geologic formation according to the invention comprises:

permanently laying, at the bottom of the water body, at predetermined locations, a series of passive reception stations and locating their respective positions in relation to known positions at the surface;

intermittently laying, at the bottom of the water body, in a vicinity of the passive reception stations, at least one active station which acquires and records signals received by a series of pickups coupled with the underlying formation by means of the passive stations, for a time required to carry out at least one acquisition and recording session of the signals; and transferring the data accumulated by each mobile acquisition station to a central collection laboratory.

According to an implementation mode, the series of pickups comprises seismic pickups permanently installed in the passive stations and coupled thereby with the underlying formation and, preferably, instruments for measuring the orientation of the seismic pickups in relation to the underlying formation, associated with the passive stations for the duration of at least one of said sessions.

According to an implementation mode, the series of pickups (comprising seismic pickups and preferably instruments for measuring the orientation of the seismic pickups in relation to the underlying formation) is permanently connected to the active stations and it is intermittently coupled with the underlying formation by means of the passive stations for the duration of at least one of said sessions.

According to another implementation mode, each active station is suited to acquire and record signals received by pickups associated with several passive stations.

According to another implementation mode, transfer of the data accumulated by each mobile acquisition station to a central collection laboratory is carried out by recovery at the surface of the mobile acquisition stations.

According to another implementation mode, transfer of the data accumulated by each mobile acquisition station to a central collection laboratory is carried out by means of transmission cables.

According to another implementation mode, laying and recovery of said passive and active stations is carried out by means of underwater vehicles.

According to an embodiment, the device intended for seismic exploration of a subsea geologic formation according to the invention comprises a series of passive reception stations each comprising a pedestal suited for permanent deployment on the bottom of the water body, provided with housings for seismic pickups and a multipoint electric connector connected by electric conductors to the various pickups, a plurality of active stations that can be connected to the passive reception stations, each one comprising an electronic unit providing acquisition and recording of signals produced by the pickups, a power supply and at least one multipoint electric connector allowing connection, by a multicable, of the electronic acquisition and storage unit to the electric connector associated with each passive station. The device preferably comprises instruments for measuring the orientation of the seismic pickups in relation to the underlying formation.

According to another embodiment, the device comprises a series of passive reception stations comprising each a pedestal suited to permanently rest on the bottom of the water mass and to couple pickups with the underlying formation, a plurality of active stations that can be connected to the passive reception stations, for the time required to carry out at least one acquisition and recording session of signals produced by the pickups, each one comprising an electronic unit suited for acquisition and storage of said signals and power supply means, the pedestal being provided with a cavity receiving said pickups, which are permanently connected to the electronic unit by a multiline cable. The pickups are for example included in a removable block containing seismic pickups and instruments (such as a compass and an inclinometer) for measuring the orientation of the seismic pickups in relation to the underlying formation, this block being arranged in a suitable cavity of the pedestal and coupled therewith according to a predetermined angular orientation The pedestal of the passive stations comprises for example a hinged cover suited to press on the removable block after it has been fed into the cavity.

Each passive reception station also preferably comprises a pinger and fastening means.

The device affords appreciable advantages:

The absence of cables connecting the passive stations to one another is one of its assets. They may be laid wherever one wants to and each bottom equipment is entirely self-contained. The dysfunctioning risks often linked with the use of connection cables for connecting marine geophones with one another and with a recording device on board a dynamically positioned boat are here greatly eliminated The flexibility of the geometry of installation of the seismic device is also particularly appreciable in obstructed zones. Unlike the reception systems comprising bottom pickup modules connected by cables (OBC) where the distance between the pickups is fixed, for example typically 12.5 m or 25 m, with the device according to the invention, the distances between the measuring points or modules are not rigidly set. It is possible to have either the same intertraces as the OBC systems, or intertraces of several hundred meters suitable for certain applications where a looser pickup network is compensated by a greater seismic shooting density. The use of long cables for connecting thus spaced out pickups limits the possibilities of OBC type systems and can even make them impossible to use.

Furthermore, unlike OBC type systems where the pickup alignements at the bottom are generally rectilinear and regular, the device according to the invention allows greater flexibility in the layout of the pickup modules (pseudo-random layouts). It is also possible to have, in the same device, different networks depending on the zones of interest of the reservoir.

Division of the device according to the invention into two complementary parts is also advantageous. The passive stations are permanently installed on the bottom The position of the various transducers and their spatial orientation, as well as the quality of their coupling with the underlying formation, are therefore the same during the various successive sessions where their signals are collected.

Since the active stations can be recovered at the end of each session or series of data collection sessions, the volume of electric batteries to load and the capacity of the memories required are much less than in the prior devices whose active parts permanently remain at the bottom. Their manufacture is therefore much less costly, and their reliability and lifetime are increased.

Besides, the mobile stations can be used between two measuring surveys in other fields, which allows to make a quick return on the initial cost of the equipment.

BRIEF DESCRIPTION OF THE DRAWINGS

Other features and advantages of the seismic exploration method and device according to the invention will be clear from reading the description hereafter of an embodiment given by way of non limitative example, with reference to the accompanying drawings wherein:

FIG. 6 shows the block diagram of an active station, and FIG. 7 diagrammatically shows a sealed connection of the cable connecting an active station to a passive station in the embodiment of FIG. 4, containing angular orientation measuring means.

DETAILED DESCRIPTION

Figure 1:
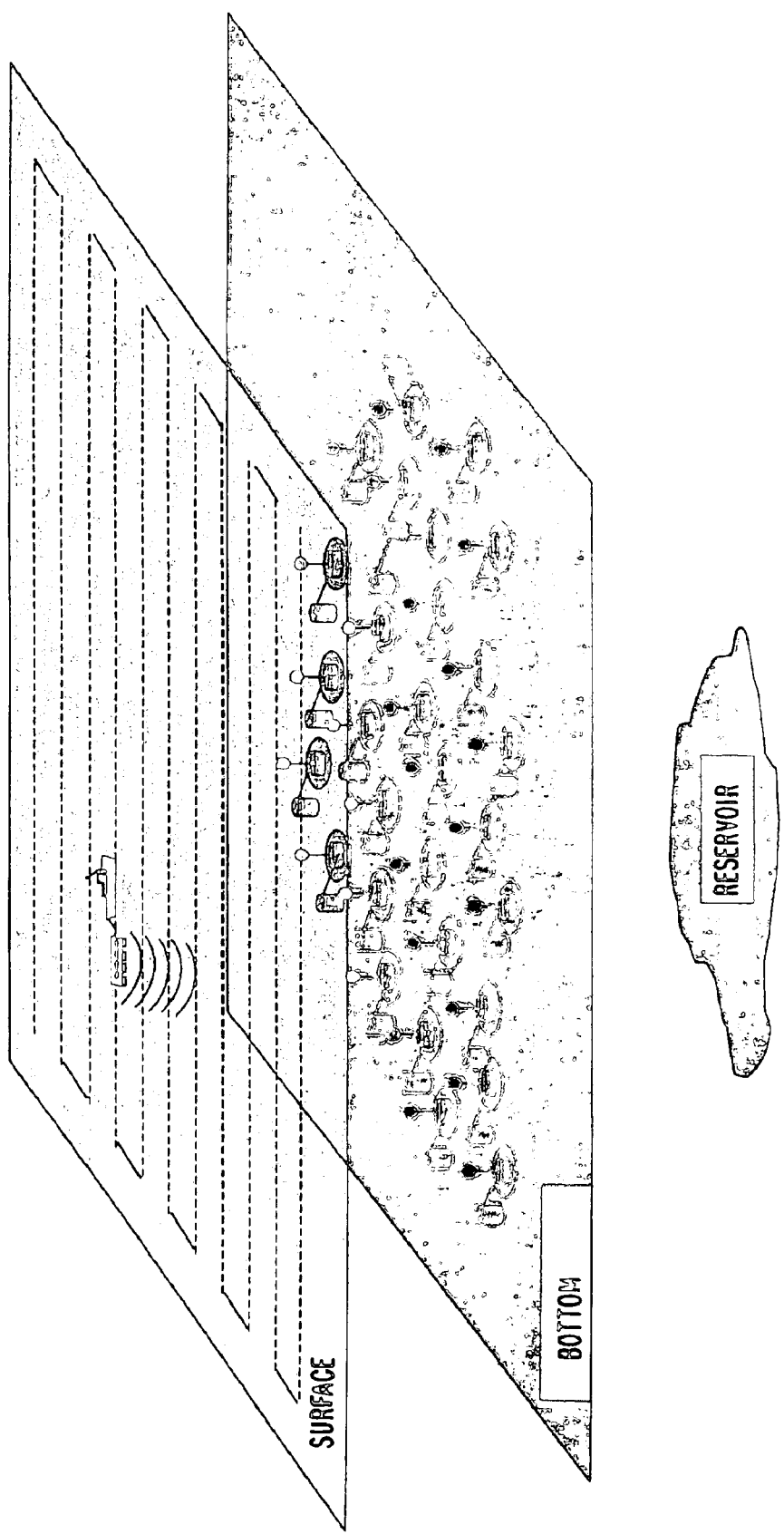
FIG. 1 shows a first implementation mode of the device installed on the sea bottom comprising passive stations connected to mobile stations during a measuring survey.
Figure 2:
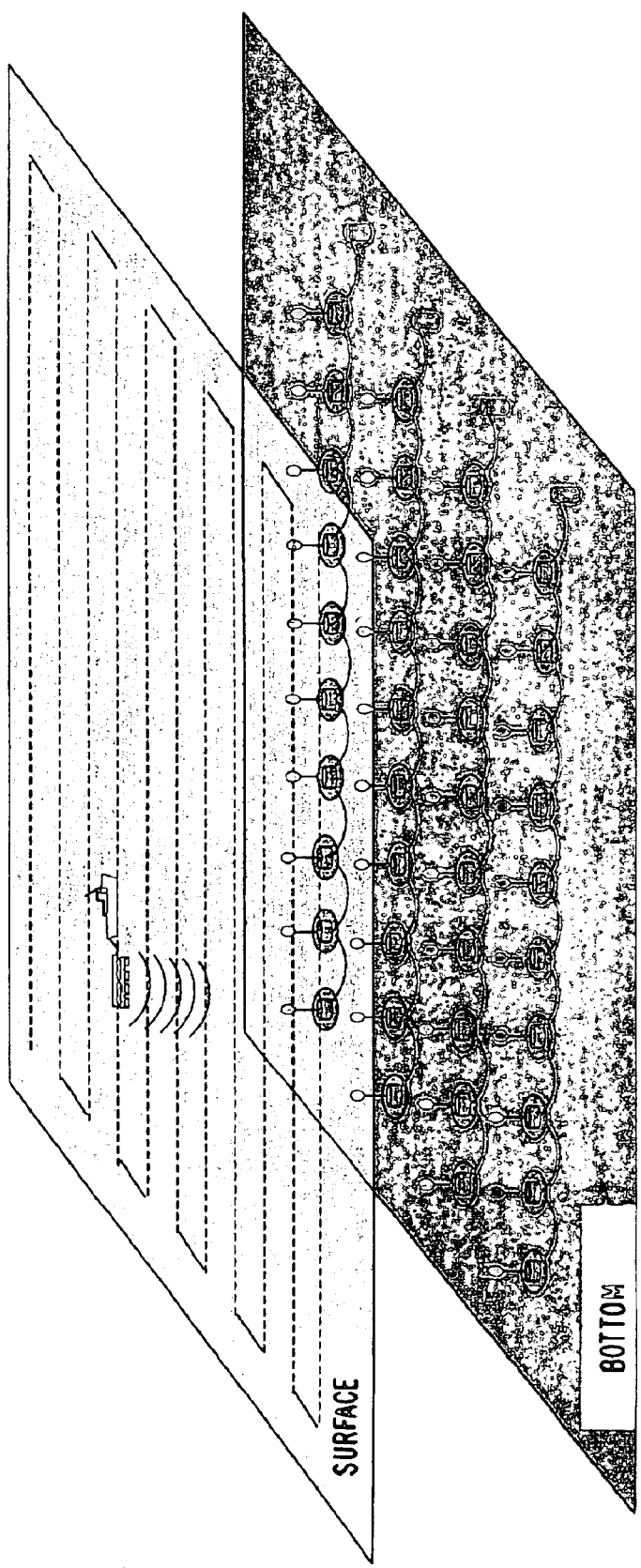
FIG. 2 shows a first implementation mode of the device where the passive stations are connected to active mobile stations in clusters.
Figure 3:
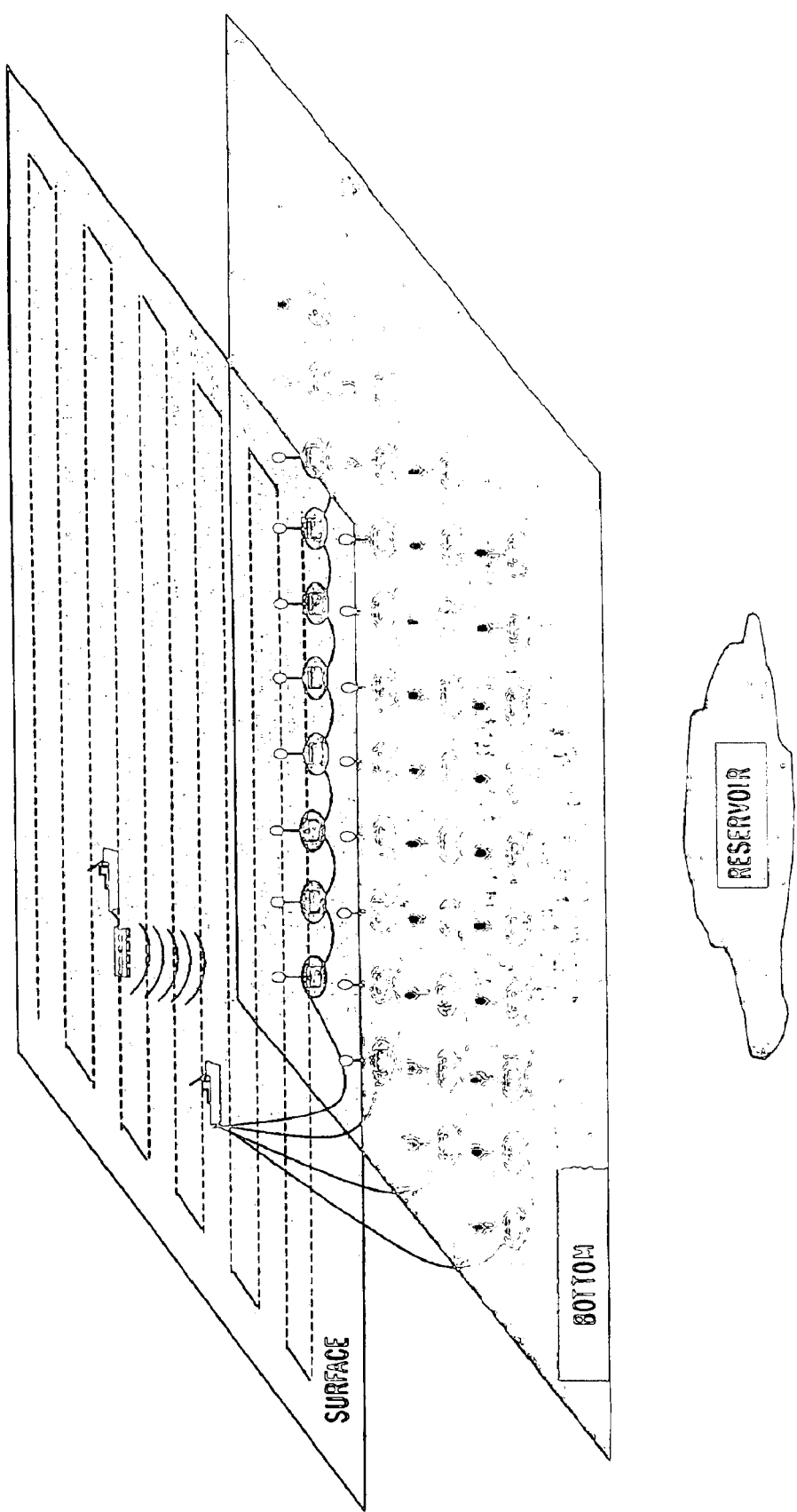
FIG. 3 shows a variant of the mode of FIG. 2 where the data acquired are transferred by connecting cables to a surface recording station (a boat or a platform), FIG. 4 diagrammatically shows a first embodiment of a passive station coupled with the sea bottom, with a chamber for permanent pickups, and connected to an active data collection station brought nearby by means of a short cable, FIG. 5 diagrammatically shows a second embodiment of a passive station suited to receive a removable block containing the seismic pickups and permanently connected to an active station.

The device according to the invention comprises a series of passive stations 1 that are brought into contact with the bottom of the water mass and intended to stay there permanently. These stations are preferably brought onto the bottom by a ROV type remote-controlled underwater vehicle (not shown), which allows to arrange them according to a particular layout: in a single line with a predetermined spacing or several parallel alignments, or an irregular or pseudo-random layout. Possible arrangements are shown in FIGS. 1 to 3. The passive stations can be installed as soon as the reservoir produces and they are intended to remain in place throughout the reservoir monitoring period (often several years). The number of permanent bases 1 and their layout at the sea bottom essentially depends on the characteristics of each subsea zone to be explored or monitored.

Each passive station 1 comprises (FIGS. 4, 6) a pedestal or deadman 2 resting by a sole 3 with preferably fastening bulges 3a to improve the stability thereof and to allow better anchoring in the sediments. This pedestal is a cement block whose weight is of the order of 300 kg for example. The dimension of the block dimensions are about 1 m in diameter and 50 cm in height for example. Its characteristics a re designed to allow good resistance to marine undercurrents. Its streamlined shape is also designed more specifically to prevent any accidental movement caused by fishing trawlers for example.

A housing 4 for one or more geophones 5 fixedly oriented and intended to pick up waves in several different directions, such as a triphone, is provided at the base of each pedestal 2 (FIG. 4), in the central part thereof The geophones can also be replaced by MEMS type (Micro-Electro-Mechanical Systems) accelerometers which are pickups of a new generation micromachined in silica. These pickups can directly deliver the seismic signal in digital form. Housing 4 provided for the pickups is in the central part of pedestal 2 where sole 3 comprises a shoulder streamlined so as to provide excellent coupling of the geophones with the underlying formation.

A hydrophone 6 is preferably associated with pedestal 2 so as to be in contact with the outside medium. A pinger P is preferably arranged outside pedestal 2. Locating pinger P works with rechargeable batteries providing long charge range (preferably at least 18 months). A multipoint sealed connector 7 that can be connected under water is fastened outside pedestal 2. It is connected to geophones 5 and to hydrophone 6. Pinger P comprises a charge circuit (not shown) also connected by lines to connector 7 through the pedestal. The piles can thus be recharged on each connection with the mobile station, as described hereafter (see FIG. 6).

In order to facilitate transportation of each passive station 1 or its recovery by the remote-controlled vehicle, even in the case where the pedestal might sink into locally very soft marine sediments, a sling line 8 of about 2 m for example, ended by a hoisting ring 9, is fastened to the upper part of the pedestal A float 10 is associated with sling line 8 to hold it vertical.

The device also comprises several active stations (or mobile stations) 11 intended to be laid by a remote-controlled vehicle or ROV (not shown), in the neighbourhood of the permanent stations, in order to collect the signals picked up by the transducers or pickups associated with each permanent passive station 1. Active stations 11 are brought near and connected to permanent stations 1 for the duration of one or more data acquisition sessions. Each mobile station 11 comprises a frame 12 serving as a ballast supporting a sealed container 13 withstanding a pressure exerted by the water layer. This container 13 contains an electronic acquisition and storage unit 14 of a well-known type and electric power supply batteries 15. A fastening ring 18 allows the mobile station to be suspended from the vehicle.

Acquisition unlit 14 is connected by conductor wires to at least one sealed type multipoint electric connector 16 arranged outside container 13. By connecting a cable 17 between electric connectors 7 and 16 of the passive station and of the mobile station respectively, the various transducers 5, 6 are connected to the different input channels of acquisition unit 14.

Linking cable 17 is provided (FIG. 5) at each end with sealed multipoint connectors. On the permanent station side, connector 19 contains an inclinometer 20 allowing to measure the angles of inclination along two axes, as well as a compass 21 for measuring the azimuth. These measurements allow to correct the seismic records so as to take into account possible variations, between two recording sessions, of the position of the pickups. Connector 19 and its receptacle 7 on passive station 1 are provided with indexing keys 22 to guarantee perfect reproducibility in the orientation measurements performed by inclinometer 20 and compass 21.

In the embodiment of FIG. 6, deadman 2 permanently installed on the sea bottom comprises an inner cavity designed to receive a removable active block 23. This block comprises the seismic pickups (geophones 5 and hydrophone 6) and a box 24 containing an orientation measuring device consisting of an inclinometer measuring the inclination along two axes and a compass for measuring the azimuth Pedestal 2 is provided with a hinged cover 25. It is lifted to clear the cavity and allow setting of removable block 23 therein. This cover 25 is closed on removable block 23 after it has been installed and it presses on it sufficiently to provide correct coupling with pedestal 2. An indexing or polarization element 26 imposes a certain orientation in the angular position of removable block 23 in relation to the cavity as it is set therein. One is thus sure that the spatial orientation of the various geophones 5 will be the same from one measuring session to the next. Removable block 23 is permanently connected to mobile acquisition station 11 and it is thus recovered with it after each measuring survey. In order to prevent the cavity from filling with sediments when removable block 23 has been removed, a solid block of equal dimensions is placed therein. This embodiment of the permanent stations requires using a mobile station 11 for each one, as shown in FIG. 1.

Figure 7:
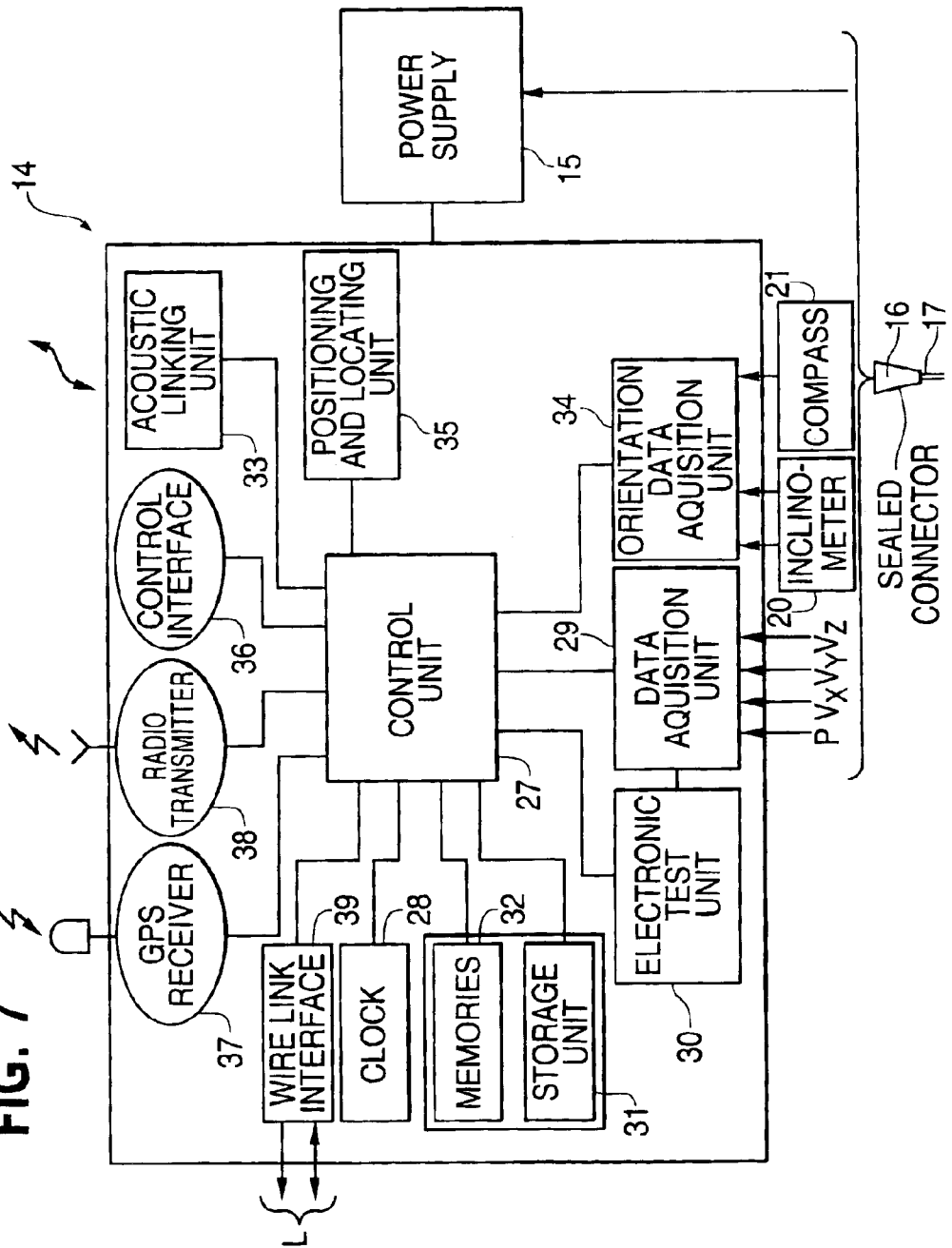

Each electronic unit 14 comprises at least (FIG. 7):
a microprocessor-based control unit 27,
a very high precision clock 28 required for data dating, which is synchronized with the GPS time before launching each active station,
a data acquisition module 29 (Vx, Vy, Vz corresponding to the three components of a three-axial geophone or triphone, and the measurement given by hydrophone P) comprising an analog seismic data acquisition and digitizing part (preamplifiers, filters),
an electronic test unit 30 is associated with each acquisition module. It is suited to check the characteristics of the geophones (natural frequency, sensitivity, damping coefficient and inner resistance), the impedance of the hydrophone, measurement of the leakage currents, the RMS response of the pickups to a calibrated signal, the crosstalk between channels, and it also allows quantification of the acquisition electronics (noise, distortion, etc.). The acquisition module and the test unit used are for example those described in detail in patent EP-615, 627 (U.S. Pat. No. 5,550,787) filed by the applicant:
a storage unit 31 comprising a microdisk or flash disk type data storage module 31, for example, associated with working memories 32. The capacity of storage module 31 is adjustable depending on the operations to be carried out. Methods of data compression without information loss, well-known to specialists, can be applied to the seismic data acquired to reduce the storage volume,
an acoustic linking device 33 allowing to control electronic test module 30, quality control operations relative to pickups 5, 6 and seismic acquisition, according to a pre-established program,
a module 34 for acquisition of the orientation data received from inclinometer 20 and compass 21 (see FIGS. 5, 7).

The batteries of supply means 15, as well as the batteries associated with transponder or pinger P (FIG. 4), can be recharged by means of a cable such as 17.

In order to increase the functionalities of each mobile station, the following elements can be added thereto:
a positioning and locating module 35 using a short or long-range acoustic base allowing to determine the position of the unit,
floatability means and a launching device (not shown) triggered by a control interface 36 allowing the mobile station, after it has been disconnected from the permanent base, to go back to the surface without any exterior intervention,
a GPS receiver 37 and a VHF radio transmitter 38 activated as soon as the active station has returned to the surface, allowing fast locating and recovery thereof,
an interface 39 for a high-rate wire link L for transferring, after recovery, the seismic data acquired by each mobile station to a control unit on board the boat without having to open sealed container 13, and also for exchanging therewith control, initialization and synchronization signals,
a series of non-seismic pickups (not shown) that can comprise, among other things, a pressure, moisture, contact detector, etc.,
a device using elements 35 to 39 is for example described in the aforementioned patent application FR-2001/16, 652.

The preferred embodiment is the embodiment of FIG. 1 where the bottom stations are self-contained. Linking cables can however also be used, as illustrated in FIGS. 2, 3, without departing from the scope of the invention.

Each acquisition unit 14 can thus possibly comprise a sufficient number of input channels to collect the signals received by the transducers of several permanent stations (see FIG. 2). In this case, each active station comprises several sealed connectors 16 that can receive several linking cables 17.

It is also possible to connect several or all of the permanent stations by cables (see FIG. 3) so that collection of the seismic signals received is performed by one or more mobile stations on board a boat or a drilling platform.

The various permanent passive stations are first installed either by means of a vehicle remote controlled from a surface installation, or by means of cables from the boat, depending on the water depth of the reservoir. Setting of the passive stations is in principle carried out only once and consequently the cost inherent in this launching operation covers the operational time of the equipment. Considering the specificities of the zone to be monitored, it is necessary to define the installation of the permanent device: number of receivers, geometry and positioning coordinates of the measuring points. The position of each laying point is known with precision by combining the absolute position data of the surface installation by means of GPS device 37, or equivalent, and the relative positioning data concerning the vehicle obtained in relation to an acoustic locating base, as already described in French patent application 2001/16,652. It may be a short or a long baseline system carried by a boat or a longer baseline system of more spaced out buoys whose positions are known with precision.

When a data collection session is scheduled, setting of active acquisition stations 11 in the vicinity of permanent stations 1, whose position is known with precision, starts by means of the remote-controlled vehicle or ROV, or possibly divers in relatively shallow zones. In order to facilitate locating during the descent, the echoes sent back by associated pinger P are detected.

In the embodiment of FIG. 6, once the mobile station is laid, the remote-controlled vehicle (ROV) connects cable 17 to connectors 7 to link the transducers of each passive station 1 with acquisition and storage unit 14.

In the embodiment of FIG. 5, the remote-controlled vehicle carries the assembly consisting of removable block 23 and associated active station 11 connected by a cable such as 17 onto the bottom. It leads removable block 23 into the cavity of pedestal 2 and closes cover 25 thereon.

Each active station has been placed under tension and precise synchronization of its clock on the GPS time has been carried out before launching. As soon as the mobile station is interconnected with the passive station, a certain number of tests are carried out, notably those allowing to check the validity of the seismic pickups, the acquired test data are stored in the mobile station and their results are transmitted for immediate control by acoustic link to the surface.

In order to minimize the electric consumption of each mobile station, start of the seismic acquisition can be programmed at the time of the real start of the seismic measurements. The power supply of each mobile station can be maintained throughout the connection with the passive station or programmed, or remote-controlled for predetermined time periods. This is useful notably when several recording sessions are scheduled in quick succession, in order to save recovery of the mobile stations in the interval. This allows their range to be increased.

During each recording session, cycles of recording of the signals received by the permanent station pickups in response to the seismic signals emitted by a source S towed by a boat (FIG. 1) are carried out. Data acquisition can be carried out on a permanent basis or during preprogrammed cycle times.

At the end of each recording session, if the time interval planned before the next one is sufficiently long, each active station 11 is recovered and brought back to the surface. It is therefore necessary to disconnect them from the passive stations which remain at the bottom until the next session (FIG. 4). Disconnection is carried out in the same way as connection, by means of a remote-controlled vehicle or of divers. Each mobile station is brought back to the surface carried by a remote-controlled vehicle or hoisted by means of a cable lowered from the surface if the depth allows to do so. In the embodiment of FIG. 6, it is the assembly consisting of the active station and of associated removable block 23 that is brought back to the surface.

Recovery of the active stations is faster when they are provided with floats and with a launching device. Once disconnected from the associated permanent stations by a remote-controlled vehicle, an acoustic launching command is sent from a surface boat and each mobile station goes up to the surface automatically. GPS receiver 37 and narrow-band radio transmitter 38 included in each mobile station are activated as soon as it reaches the surface of the water. Locating by the recovery boat is thus greatly facilitated.

The data stored are then transferred on board the boat in a central laboratory. Prior to carrying out data recovery, the clock of each active station 11 is once again synchronized with precision with the time given by GPS device 37 so as to determine the possible time drift, which will allow to recalibrate dating of the acquired data.

Recovery of the data is carried out either by opening sealed container 13, extraction of storage memories 31 (FIG. 7) and data transfer to the central laboratory, or preferably using high-rate link L between the active station and the laboratory. Comparative analysis of the recordings made at different times can be carried out, allowing to find changes or modifications occurred in the zone monitored.

The last necessary stage consists in reconditioning each active station 11: replacement or recharging of the batteries, reactivation of the launching device, if there is one, and reinitialization of the data storage memories. The mobile station is again operational.

What is claimed is:

1. A method of seismic exploration of an underwater geologic formation comprising:
    laying, at a bottom of a water body, at spaced apart locations, at least one passive reception station and locating respective positions of each passive reception station in relation to known positions at a water surface, each passive reception station including pickups coupled to the geologic formation for receiving geologic formation;
    laying, at the bottom of the water body, in a vicinity of the at least one passive reception stations, at least one active acquisition station which acquires and records signals received by the pickups of the at least one passive reception station in a vicinity thereof coupled thereto and with the geologic formation, for a time required to carry out at least one acquisition and recording session of the signals; and
    transferring data accumulated by each active acquisition station to a central collection laboratory.

2. A method as claimed in claim 1, wherein the pickups comprise seismic pickups permanently installed in the passive stations and coupled to the geologic formation.

3. A method as claimed in claim 2, wherein the pickups comprises instruments associated with the passive stations for measuring an orientation of the seismic pickups in relation to the geologic formation for a duration of at least one of the sessions.

4. A method as claimed in claim 1, wherein the pickups are permanently connected to the at least one active station and intermittently coupled with the geologic formation by the passive stations for a duration of at least one of the sessions.

5. A method as claimed in claim 4, wherein the pickups comprise seismic pickups and instruments for measuring an orientation of the seismic pickups in relation to the geologic formation.

6. A method as claimed in claim 1, wherein each active station acquires and records signals received by pickups associated with multiple passive stations.

7. A method as claimed in claim 2, wherein each active station acquires and records signals received by pickups associated with multiple passive stations.

8. A method as claimed in claim 3, wherein each active station acquires and records signals received by pickups associated with multiple passive stations.

9. A method as claimed in claim 4, wherein each active station acquires and records signals received by pickups associated with multiple passive stations.

10. A method as claimed in claim 5, wherein each active station acquires and records signals received by pickups associated with multiple passive stations.

11. A method as claimed in claim 1, wherein transfer of the data accumulated by each active acquisition station to the central collection laboratory is performed by recovery, at the water surface, of the active acquisition stations.

12. A method as claimed in claim 2, wherein transfer of the data accumulated by each active acquisition station to the central collection laboratory is performed by recovery at the water surface, of the active acquisition stations.

13. A method as claimed in claim 3, wherein transfer of the data accumulated by each active acquisition station to the central collection laboratory is performed by recovery at the water surface, of the active acquisition stations.

14. A method as claimed in claim 4, wherein transfer of the data accumulated by each active acquisition station to the central collection laboratory is performed by recovery at the water surface, of the active acquisition stations.

15. A method as claimed in claim 5, wherein transfer of the data accumulated by each active acquisition station to the central collection laboratory is performed by recovery at the water surface, of the active acquisition stations.

16. A method as claimed in claim 6, wherein transfer of the data accumulated by each active acquisition station to the central collection laboratory is performed by recovery at the water surface, of the active acquisition stations.

17. A method as claimed in claim 1, wherein transfer of the data accumulated by each active acquisition station to the central collection laboratory is performed by transmission cables.

18. A method as claimed in claim 2, wherein transfer of the data accumulated by each active acquisition station to the central collection laboratory is performed by transmission cables.

19. A method as claimed in claim 3, wherein transfer of the data accumulated by each active acquisition station to the central collection laboratory is performed by transmission cables.

20. A method as claimed in claim 4, wherein transfer of the data accumulated by each active acquisition station to the central collection laboratory is performed by transmission cables.

21. A method as claimed in claim 5, wherein transfer of the data accumulated by each active acquisition station to the central collection laboratory is performed by transmission cables.

22. A method as claimed in claim 6, wherein transfer of the data accumulated by each active acquisition station to the central collection laboratory is performed by transmission cables.

23. A method as claimed in claim 11, wherein transfer of the data accumulated by each active acquisition station to the central collection laboratory is performed by transmission cables.

24. A method as claimed in claim 1, wherein laying and recovery of the passive and active acquisition stations is carried out by underwater vehicles.

25. A system for providing seismic exploration of an underwater geologic formation, comprising at least one passive reception stations, each passive reception station comprising a pedestal for providing deployment on a bottom of a water body, a housing containing seismic pickups and an electrical connector connected by electric conductors to the seismic pickups, at least one active stations for connection to the at least one passive reception stations, each passive reception station comprising an electronic unit for acquiring and storing seismic signals received by the pickups, a power supply and at least one electrical connector for connecting, by a the electronic unit to the electrical connector associated with each passive reception station.

26. A system as claimed in claim 25, comprising instruments which measure an orientation of the seismic pickups in relation to the geologic formation.

27. A system for providing seismic exploration of an underwater geologic formation, comprising at least one passive reception station, each passive reception station comprising a pedestal for providing deployment on a bottom of the water body and to couple pickups with the geologic formation, at least one active station for connection to the at least one passive reception stations, for a time required to carry out at least one acquisition and recording session of seismic signals received by the pickups, each pickup comprising an electronic unit for acquiring and storing of the seismic signals and a power supply, the pedestal including a cavity for receiving the pickups, which are connected to the electronic unit by a cable.

28. A system as claimed in claim 27, wherein the pickups are included in a removable module containing the pickups and instruments for measuring an orientation of the pickups in relation to the geologic formation, the module being disposed in a cavity of the pedestal coupled therewith with a predetermined angular orientation.

29. A system as claimed in claim 28, wherein the pedestal comprises a hinged cover for contacting the removable module after the removable module has been set in the cavity.

30. A system as claimed in claim 28, wherein the measuring instruments include a compass and an inclinometer.

31. A system as claimed in claim 29, wherein the measuring instruments include a compass and an inclinometer.

32. A system as claimed in claim 25, wherein each passive reception station comprises a pinger.

33. A system as claimed in claim 27, wherein each passive reception station comprises a pinger.

34. A system as claimed in claim 25, wherein each passive reception station comprises a means for contacting the geological formation.

35. A system as claimed in claim 27, wherein each passive reception station comprises a means for contacting the geological formation.

* * * * *